Patented Nov. 25, 1924.

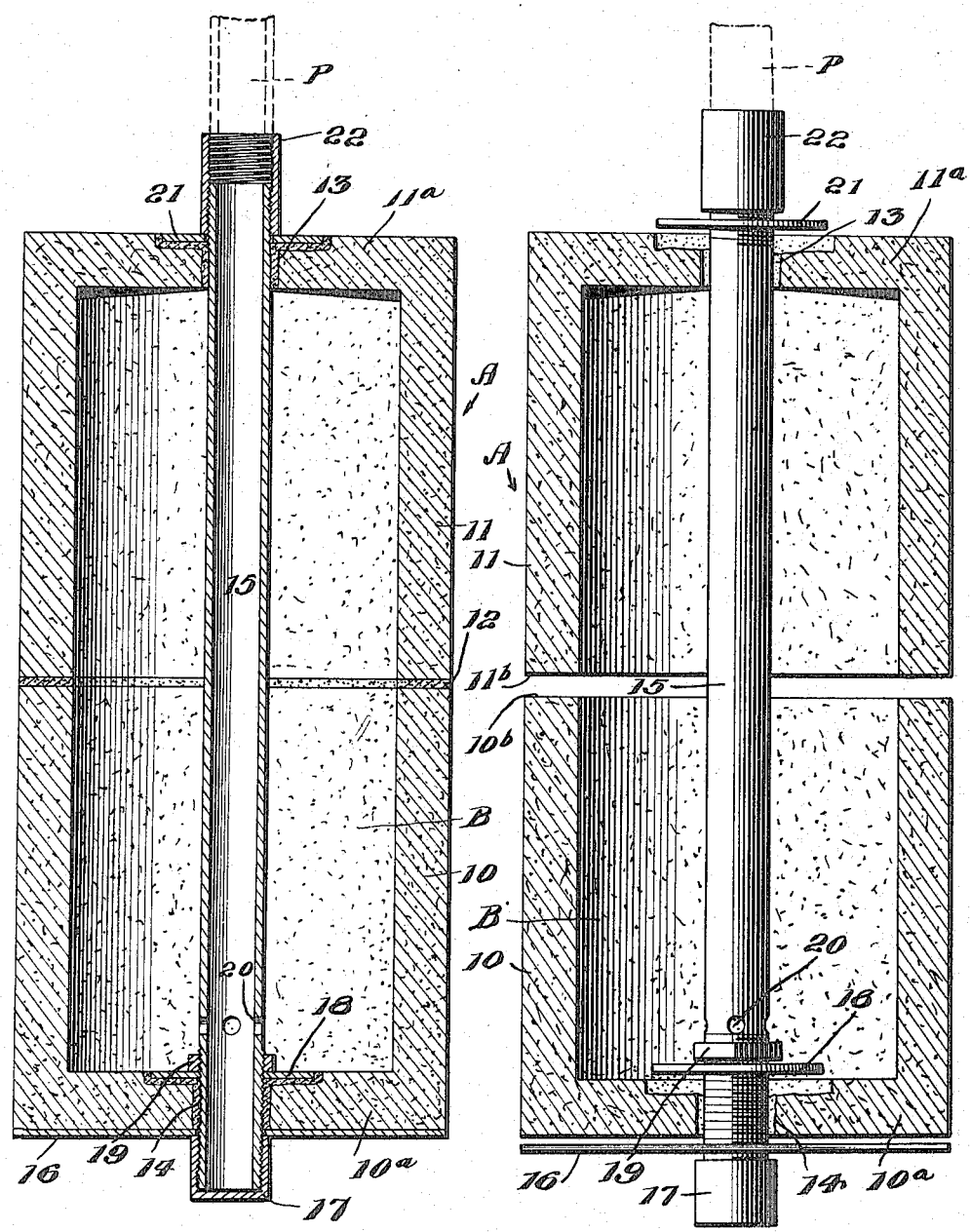

1,517,165

UNITED STATES PATENT OFFICE.

SAMUEL P. POWELL, OF ASTORIA, ILLINOIS.

FILTER.

Application filed August 11, 1921. Serial No. 491,410.

*To all whom it may concern:*

Be it known that I, SAMUEL P. POWELL, a citizen of the United States of America, and resident of Astoria, Fulton County, State of Illinois, have invented certain new and useful Improvements in Filters, of which the following is a specification.

This invention relates to certain improvements in filters and the like; and the nature and objects of the invention will be readily understood by those skilled in the art in the light of the following explanation and detailed description of the accompanying drawings illustrating what I at present believe to be the preferred embodiments or mechanical expressions of my invention from among other forms, arrangements, combinations and constructions within the spirit and scope thereof.

It is an object of the invention to provide certain improvements in the construction and arrangement of filters or strainers and in the method of forming the same.

It is a further object of the invention to provide a filter or strainer for fluids, in which a filtered fluid supply chamber is formed by a closed porous walled vessel adapted to be immersed in a body of fluid to be filtered, so that the fluid passes through the porous walls of the vessel into the chamber formed thereby, and from which supply chamber filtered fluid is withdrawn in a clear, pure state free from impurities, sediment and other foreign matter.

It is a further object of the invention to provide a filter or strainer for fluids composed of a closed, porous walled vessel forming a filtered fluid supply chamber, with a construction and arrangement of filtered fluid discharge from said chamber which performs the further function of a reinforcement and strengthening element for the porous vessel structure.

It is a further object of the invention to provide a fluid filter or strainer constructed of porous material sections cemented, or otherwise suitably secured together, to form a closed, porous walled vessel, and to so construct and mount a filtered fluid discharge pipe for withdrawing filtered fluid from the porous vessel, so formed that said discharge pipe acts as a tie or tension rod between the sections of the vessel to firmly and rigidly bind and maintain the same in proper position against strains and stresses to which the porous vessel may be subjected in operation and use.

Another object of this invention is to provide a filter vessel formed of two hollow, porous material sections each closed at one end and open at the opposite end, respectively, which sections are cemented together at the open ends thereof, so that a hollow, closed porous walled and substantially monolithic or one-piece structure results.

Another object of the invention is to provide a filter structure particularly adapted for mounting on the suction pipe or stock of a pump within a well or cistern, so that the pump draws fluid from the filter and delivers the fluid filtered for use and consumption.

A further object of the invention is to provide an improved porous material composition particularly adapted for use in forming filters.

And still another object of the invention is the provision of certain improvements in the method of assembling and forming filters of the closed, porous walled vessel type.

The invention also includes among certain other objects, to provide a filter of simple design and construction which can be readily manufactured in quantities at comparatively small cost and which will show an increased efficiency in operation.

With these and various other objects in view, my invention consists in certain novel features of construction and in combinations and arrangements as more fully and particularly set forth and specified hereinafter.

Referring to the accompanying drawings:

Fig. 1 is a vertical section through a filter embodying the features of the present invention.

Fig. 2 is a view of the various elements of a filter embodying the invention in relative position for assembling, showing the filter vessel sections in vertical section and the discharge or suction pipe and mounting and securing means in side elevation.

In the embodiment of my invention illustrated in the accompanying drawings, the filter comprises the closed, porous walled vessel A which is cylindrical in form and provides the filtered fluid supply chamber B. However, it is to be understood that the invention is not limited to the use of a cylindrical form for the filter vessel A, as any desired shape or form may be utilized to meet the requirements of any particular installation or use, without in any manner departing from the spirit and scope of the invention. The filter vessel A is formed of two sections 10 and 11 which are closed at the ends 10$^a$ and 11$^a$, respectively, and open at the opposite ends 10$^b$ and 11$^b$, respectively. These sections 10 and 11 form, in effect, jar like structures which are secured together in alinement at their open ends by means of cement or the like 12, to form the closed substantially monolithic or one-piece, porous walled filter vessel A.

The closed ends of the filter vessel A which are formed by the end portions 10$^a$ and 11$^a$ of the porous material jars or sections 10 and 11, respectively, are provided with central alined bores or openings 13 and 14, respectively, and a discharge or suction pipe 15 is mounted in these alined bores 13 and 14 and extends therebetween longitudinally and centrally through the filter vessel A. Hereinafter, for purposes of description, it is proposed to refer to the end 10$^a$ of the filter vessel A, as the lower end, and the closed end 11$^a$ as the upper end, and to refer to other elements of the structure in like manner with respect to these upper and lower filter vessel ends. The lower end of the discharge pipe 15 extends through the bore 14 and is provided with a flat metal strap or bar 16 which extends across and bears against the outer face of the closed end 10$^a$ of the vessel A, and through which the lower end of the pipe 15 extends. A cap 17 is secured onto the end of the pipe 15 to close the same and this cap bears against the bar or strap 16, as clearly shown in Fig. 1 of the accompanying drawings. Within the filter vessel A, a washer 18 is placed around the discharge pipe 15, bearing upon the inner face of the lower end 10$^a$ of the filter vessel and a lock or tightening nut 19 is mounted on the pipe 15 on suitable threads, so that by screwing the nut 19 down onto the washer 18 the lower end of the discharge or suction pipe 15 is securely mounted in the bore 14 of the lower closed end of the filter vessel. A series of fluid inlet openings or ports 20 are provided in the discharge pipe 15 adjacent the lock nut 19 at the lower or bottom portion of the filtered fluid supply chamber B of the filter vessel A. In order to prevent leakage of fluid around and between the discharge pipe 15 and the bore 14 through the lower end 10$^a$ of the vessel A, a suitable cement is interposed around the pipe 15 in the bore 14 and the washer 18 to effectively seal the bottom of the filter and prevent passage of fluid thereinto, other than through the porous walls thereof.

The upper or discharge end of the pipe 15 extends through the bore 13 in the upper closed end 11$^a$ of the filter vessel A, and a distance outwardly therebeyond. A washer or the like 21 is mounted around the pipe 15 and bears against the outer face of the closed end 11$^a$ of the vessel A. A suitable cement is interposed in the bore 13 around the pipe 15 and also around the washer 21 to effectively seal the bore 13 against passage of fluid therethrough, in a manner similar to the sealing of the lower end of the discharge pipe as hereinbefore described. The upper, outer end length of the pipe 15 is formed with screw threads 15$^a$ and an internally threaded sleeve or coupling 22 is mounted on the end of the pipe 15. The coupling 22 is screwed down onto the pipe 15 until it bears against the washer 21 and is tightened sufficiently to firmly bind and maintain the two sections 10 and 11 of which the vessel A is formed, under pressure. Thus, in this manner the discharge or suction pipe 15 acts as and performs the function of a tie or tension rod reinforcing and strengthening the porous filter vessel A against breakage.

The jar-like sections of which the filter vessel A is constructed are formed of a porous material molded, cast or otherwise formed to provide the desired size and shape. By experiment and experience, I have developed a composition composed of parts of washed sharp pea gravel; sand; charcoal; and Portland cement which may be readily worked in the plastic state to the desired shape and when hardened forms a porous material which a fluid passes readily through and which removes all sediment, impurities and other foreign matter, from the fluid passed therethrough, leaving the fluid in a clear pure state.

The present invention includes a novel method of assembling and constructing the hereinbefore described fluid filter, which method will now be described, particular attention being directed to Fig. 2 of the accompanying drawings. Two of the jar-like sections, constructed of the hereinbefore described porous material composition, are utilized and the discharge or suction pipe 15 with the lower lock nut 19 is inserted in the bore 14 of the lower section 10 with the washer 18 interposed between the nut 19 and the inner face of the section end 10$^a$. The bar or plate 16 is placed over the outer, lower end of the pipe 15 and the cap 17 is then mounted on the pipe 15. The necessary cement is applied to prevent passage of the fluid around the pipe 15 and the cap 17, or the lock nut 19, is tightened to securely and rigidly fasten the lower end of the discharge pipe to and in the lower closed end of the section 10. After the cement has set it will be apparent that a leak proof rigid joint of considerable strength results. Next a suitable cement is applied to the edges of the open end 10^b of the section 10. I prefer to utilize a rich putty-like Portland cement for adjoining the two sections together, as well as for sealing the bores through which the discharge pipe 15 extends and is secured. After the proper amount of cement is applied around the open end of the lower section 10, the upper section 11 is placed with its open end down thereon and the discharge pipe 15 is extended upwardly through the bore 13 of the closed end 11^a. The edge of the open end 11^b of the section 11 will rest upon the cement on the edge of the open end 10^b of the lower section and a suitable mortar joint can be formed between and firmly cementing the two sections together to form the substantially monolithic porous vessel A. Before the cement 12 has set, the washer 21 is placed around the upper outer end length of the pipe 15, and the coupling 22 is screwed onto the threaded end of the pipe until its bears against the washer 21. The coupling 22 is then tightened and through the pipe 15, draws the two sections tightly together with the cement 12 forming a rigid mortar joint therebetween.

In the operation and use of the filter as described, the filter vessel A is immersed in the liquid to be filtered and a pump, or other suitable means, is connected to the upper end of the discharge pipe 15 means of the coupling 22. The fluid in which the filter vessel is immersed will pass through the porous walls of which it is formed and fill the filtered fluid chamber B, then the pump connected to the discharge pipe 15 is operated and fluid will pass into the pipe 15 through the inlet ports 20 and be withdrawn through the pipe 15 to the point of distribution and use. In Fig. 1 of the accompanying drawings the end of a pump stock or suction pipe P is illustrated in dotted lines connected to the upper end of the discharge pipe 15 by means of the coupling 22.

Due to the use of the bar or plate 16 extending substantially across the lower end of the filter vessel A and distributing the strains and stresses over a comparatively large area, and the washer 21 at the upper end of the vessel A, considerable pressure can be exerted by the discharge pipe 15 to bind and secure the sections 10 and 11 together, and to further act as a rigid reinforcement strengthening the completed vessel structure.

A filter constructed in accordance with the present invention can be utilized in a number of ways, but it is peculiarly adapted for use in combination with a well or cistern pump, the filter vessel being positioned at the bottom of the well or cistern, immersed in the fluid therein, and with the pump stock or suction pipe connected with the filter discharge pipe 15, to withdraw filtered fluid from the supply chamber B. It is to be understood however, that it is not intended or desired to limit the invention to this particular use and application.

It is evident that the invention is capable of various changes, variations and substitutions and hence I do not desire to limit the invention to the exact disclosures hereof.

Desiring to protect my invention in the broadest manner legally possible, what I claim is:

1. A filter embodying a pair of jar-like porous material sections cemented together at the open ends thereof to form a substantially monolithic closed end porous vessel providing a filtered fluid chamber therewithin, a discharge pipe extending longitudinally through said vessel and transversely through the opposite closed ends thereof, said pipe extended at the opposite ends a distance exteriorly of the vessel and provided at one end with a closure cap therefor, a bearing plate mounted on the exterior of the closed pipe end against the end wall of the vessel, a bearing plate mounted on the closed end of the pipe within the vessel against the inner side of the vessel end walls, and means for binding the vessel end wall between said bearing plates to maintain said discharge pipe in mounted position in the vessel.

2. A filter embodying a pair of jar-like porous material sections cemented together at the open ends thereof to form a substantially monolithic closed end vessel providing a filtered fluid chamber therewithin, a discharge pipe extending longitudinally through said vessel and the chamber therewithin, said discharge pipe traversing the opposite closed ends of the vessel and extended a distance exteriorly therebeyond, respectively, a closure cap on one end and a coupling member on the opposite end of said pipe, bearing plates mounted on said pipe at the closed end thereof on the exterior and interior of the vessel end wall, respectively, bearing against said wall, a bearing plate on the opposite end of said pipe bearing against the adjacent vessel end wall, and adjustable means on the closed end of said pipe forcing said bearing plates against the vessel end walls to maintain said pipe in position therein and forming a tie rod securing said vessel sections against displacement, said pipe formed with a series of intake ports adjacent the closed end thereof within said vessel chamber.

SAMUEL P. POWELL.